Sept. 16, 1958 U. RAYDT ET AL 2,852,597
SHEATHED ELECTRIC CABLE
Filed Oct. 17, 1952 5 Sheets-Sheet 1

Inventors
Ulrich Raydt
Karl Heinz Hahne
By Robert E. Burns
Attorney

Sept. 16, 1958  U. RAYDT ET AL  2,852,597
SHEATHED ELECTRIC CABLE
Filed Oct. 17, 1952  5 Sheets-Sheet 2
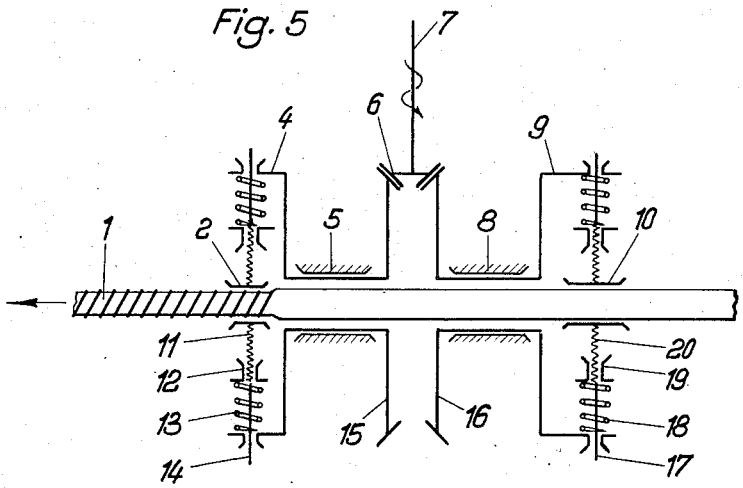
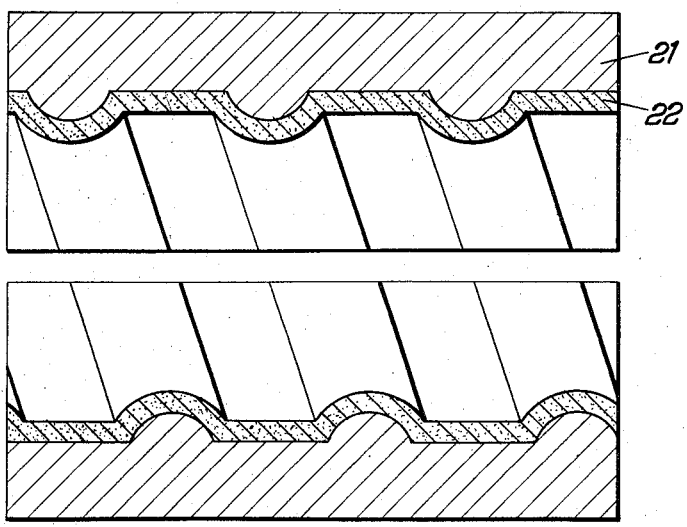
Inventors
Ulrich Raydt
Karl Heinz Hahne
By Robert E. Burns
Attorney Sept. 16, 1958 U. RAYDT ET AL 2,852,597
SHEATHED ELECTRIC CABLE
Filed Oct. 17, 1952 5 Sheets-Sheet 3

Inventors
Ulrich Raydt
Karl Heinz Hähne
By Robert E. Burns
Attorney

Sept. 16, 1958 U. RAYDT ET AL 2,852,597
SHEATHED ELECTRIC CABLE
Filed Oct. 17, 1952 5 Sheets-Sheet 5

Inventor:
Ulrich Raydt
Karl Heinz Hahne
By Robert E. Burns
Attorney

United States Patent Office 2,852,597
Patented Sept. 16, 1958

2,852,597

SHEATHED ELECTRIC CABLE

Ulrich Raydt and Karl Heinz Hahne, Osnabruck, Germany, assignors to Osnabrucker Kupfer- und Drahtwerk, Osnabruck, Germany, a corporation of Germany Application October 17, 1952, Serial No. 315,305

Claims priority, application Germany October 22, 1951

7 Claims. (Cl. 174—107)

This invention relates to metal-sheathed electric cables.

Cable-sheaths made of a metal having a higher melting point than lead are generally produced in the following manner:

Either the cable-core is drawn into a seamless tube having a diameter greater than that of the cable-core, during or after the manufacture of the tube, or a metal strip is wound around the cable-core, the strip edges being welded together; in the latter case, also, the tube formed by the welded strip has a greater diameter than the cable-core, and like the seamless tube is then pressed closely on to the core by mechanical deformation.

These cable-sheaths possess little flexibility, and in order to increase their flexibility they are usually corrugated. However, this mechanical deformation greatly strains the metal, and it may be so great that the sheath becomes fractured even during the corrugation, or upon bending of the finished cable.

For this reason success has not been achieved hitherto in producing electric cables with a satisfactory corrugated aluminum sheath manufactured from a welded strip.

As can be readily understood, an aluminum sheath pressed around the cable-core by the sheathing press can no longer be corrugated to a sufficient extent to improve the flexibility appreciably, since the core would be damaged by any considerable corrugation of the sheath.

Corrugated cable-sheaths made of steel have a substantially sinusoidal form of corrugation, necessarily involving considerable waste of material.

The present invention is based on the realization that, in a corrugated cable-sheath, the essential points are the profile of the corrugations and the least possible mechanical deformation of the sheathing tube, so that a smooth tube, especially a seamless tube produced by means of an extrusion press or a sheathing press, will not be detrimentally hardened, and the corrugated sheath will be more flexible. The invention has for its main object to provide the most favorable form for the profile of the corrugations and of the expansion elements produced in the sheathing by the corrugation profile.

Other objects of the invention are to provide means and a method for the production of cable-sheaths having the improved corrugation profile as well as means and a method for the drying and impregnation of the sheathed cables.

The invention is hereinafter described with reference to the accompanying drawings, in which:

Fig. 5 represents diagrammaticaly complete apparatus for the corrugation of the sheath.

Fig. 6 is a section on an enlarged scale of a countertool employed in the corrugating apparatus.

Figure 1:
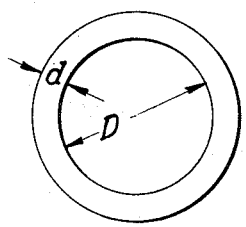
Fig. 1 is a diagram representing an electric cable coiled about a circle of small diameter.
Figure 2:
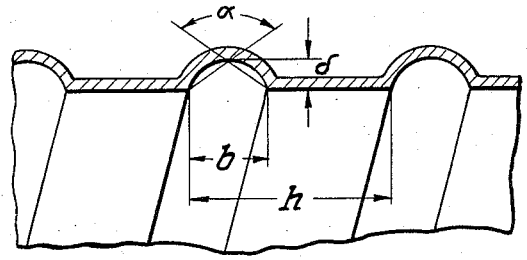
Fig. 2 is a part section on a larger scale of a portion of the cable-sheath according to the invention.

As stated above, the main object of the invention is to provide the most favourable form for the profile of the corrugations in the cable-sheath of an electric cable, the sheath comprising outwardly curved expansion elements arranged annularly or helically around the longitudinal axis and intervening non-expansible elements resting in contact with the cable-core. To this end, the invention is based upon the following consideration:

When a cable of diameter $d$ is bent around a circle of minimum admissible bending diameter $D$, as shown in Fig. 1, the diameter of the neutral axis of the cable is $D+d$. Thus the cable-sheath must have such a capacity for expansion in the zone of greatest bending, that the expansion elements produced by its corrugation will either be stretched out straight or will still retain a certain reserve of expansibility. This will be achieved if the following relationship exits between the capacity for expansion $\Delta 1$, and the width $b$, the pitch $h$ and the height $\delta$ of the expansion elements (Fig. 2). For the sake of simplicity it is here assumed that the expansion elements are formed to triangular section. Then the maximum possible elongation of the expansion element is:

$$\Delta 1 = 2\sqrt{\delta^2 + \frac{b^2}{4}} - b$$

The total elongation of the outer fibre of the bent cable is $\pi.d$, independently of the diameter $D$ of the circle around which the cable is bent. This elongation must be furnished by the total number of expansion elements situated on the length bent around this diameter. This number represents the proportion between the length of the bent neutral axis and the pitch of the expansion elements, whether they are arranged in annular form or in helical form. From this there is obtained the equation:

$$\frac{\pi(D+d)}{h}\Delta 1 = \pi.d$$

If, as is usual, the bending diameter $D$ is in a fixed proportion to the diameter $d$ of the cable, this proportion being designated by $k$, there is obtained from the equation $D=k.d$, by the use of the above expression for $\Delta 1$, the equation:

$$\frac{h}{k+1} = 2\sqrt{\delta^2 + \frac{b^2}{4}} - b$$

If the width $b$ of the expansion elements is set in a fixed ratio $v$ to the pitch $h$, then from $b=v.h$, there is obtained the expression:

$$\delta = h\sqrt{\frac{1}{4(k+1)^2} + \frac{v}{2(k+1)}}$$

In practice the most suitable ratio $v$ has been found to have the value 0.38, which is derived from the harmonic division of the pitch $h$. If, for example, the minimum admissible bending diameter is assumed to be ten times the cable diameter, then from the above equation there is obtained the value $\delta=0.14h$. Most conveniently the expansion elements are given the outwardly arched bellows-like shape illustrated in section in Fig. 2.

Figure 3:
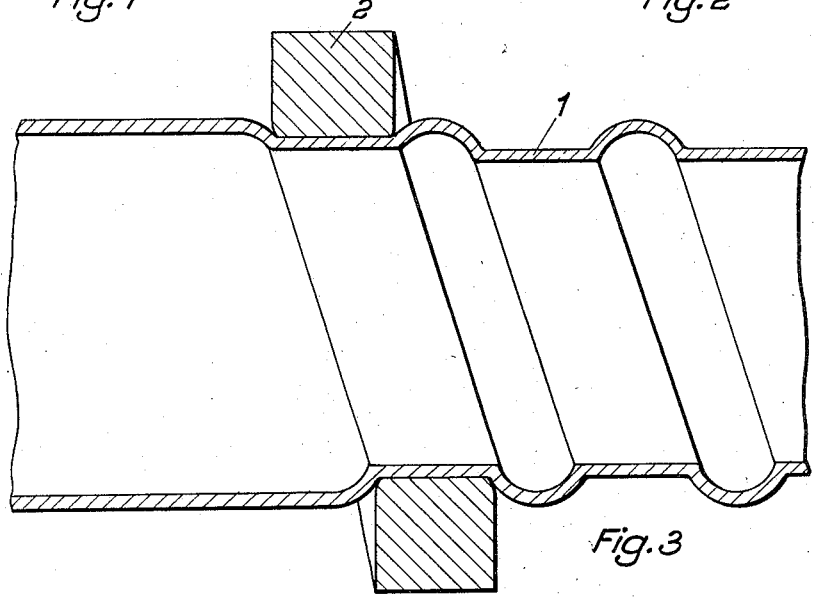
Fig. 3 represents the corrugating of the sheath by means of a metal-deforming tool.

Fig. 3 shows in section a tool formed in accordance with this equation for the production of the corrugations in the smooth tube, which is deformed with the tool as far as possible just as it comes out from the tube extrusion press or tube-making machine. With this profiled tool a relatively wide cylindrical part (Fig. 2, h—b) is pressed closely on to the cable-core in the act of corrugating the metal tube. Substantially only this pressed-in part is mechanically deformed, whereas the arched portions (Fig. 2, b) are merely curved, so that they are work-hardened only to a small extent.

The forming tool consists for example of a wide metal band wound helically, or of a plurality of helically arranged steel or other metal rollers. The interior of the metal strip or the common internal tangent of the helically arranged rollers is adapted to the shape of an Archimedean spiral. In Fig. 3, reference numeral 1 indicates the portion of the sheath pressed closely inwards and adapted to rest upon the cable-core (not shown), 2 is the helically wound and spirally shaped tool.

Figure 4A:
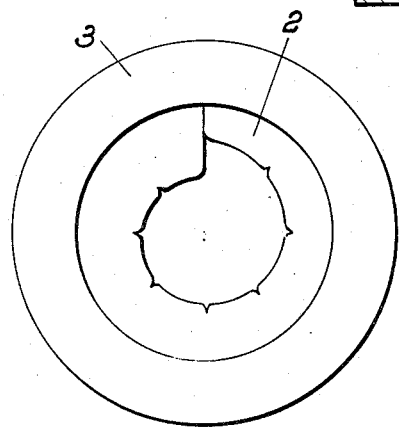
Figs. 4 and 4a show the corrugating tool.
Figure 4:
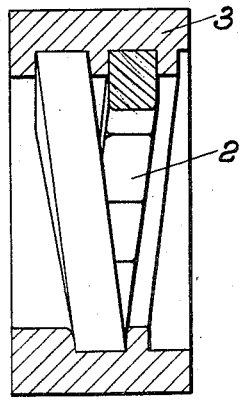

Figs. 4 and 4a show a holding device 3 for the wide helically wound tool 2 or the helically arranged forming rollers to be inserted therein. The device consists of a sleeve with a screw thread 3a turned therein, into the groove of which the helically wound and spirally formed strip or forming tool 2 is appropriately fixed, or in which the rollers are inserted. As will be understood, the helically wound tool 2, can be integral with this sleeve and cut directly therein. Preferably the holding device is divided diametrically so that it can be set in place upon the sheath tube from the exterior, and can also be adjusted if necessary, the individual parts then conveniently being kept under spring pressure. This resilient mounting is of particular advantage in the manufacture of high-tension cables impregnated with compounds, since the tool can then yield resiliently, if the pressure becomes too great, due to the compound damming up or to any unavoidable irregularities of the core diameter. It is also possible to produce a resilient effect by securing the helical metal strip on one side only.

As best seen in Fig. 4a, the inner contour of the helical tool can be interrupted, in order to reduce friction. The rise of the spiral which constitutes the inner contour of the forming tool, is expediently made greater for cables having their cores impregnated with an insulating oil or compound than in other cables with unimpregnated cores. It is then possible for the cable to perform an eccentric movement within the forming tool, if the impregnating compound dams up in the sheath. In the eccentric movement, the axis of the cable moves away from the shortest chord of the spiral, namely the vertical spiral axis marked in Fig. 4a, and shifts to another chord of greater length. The diameter of the non-expansible elements or cylindrical parts (Fig. 2, h—b) of the sheath can be adapted to the volume of impregnating compound at the point of the cable where the forming tool acts.

This capacity for adjustment can be increased by rotating the forming tool at a speed dependent upon the resistance load, for example by a series-wound electric motor. The faster the forming tool rotates, the more centrally will the cable run. If resistance increases, due to damming up of the compound, the forming tool runs more slowly, and thus renders it easier for the cable to move to an eccentric position relative thereto.

In the deformation of the metal tube to form a corrugated sheath, the tool-holder 3 is screwed over the sheath tube together with the screw-threaded ring or forming tool 2. This can be effected while the seamless tube coming from the sheath press is pressed about the cable-core, or after the sheath tube has been produced from a metal strip, or while the laid out tube, into which the cable-core has been drawn, is being pressed closely upon the core by means of the forming tool. In this operation the device with the forming tool can be stationary, or can be moved along the tube. Due to the rotation of the forming tool, there will be a certain torque acting upon the tube, which torque can be resisted if the tube is chucked or clamped at the end, or if simultaneously with the rotation of the forming tool a further tool is provided for exerting a contrary torque acting against the first. Fig. 5 shows an example of a suitable embodiment of the apparatus, wherein:

1 is the sheath tube;
2 the corrugating or forming tool made in one or more parts;
4 a chuck for carrying and rotating the forming tool;
5 the bearing for the chuck 4;
6 a bevel wheel and 7 its driving shaft;
8 the bearing for a chuck 9 rotating in the opposite direction to the chuck 4;
10 the counter-tool (illustrated on an enlarged scale in Fig. 6);
11 the pressure-adjusting screws for the multi-part forming tool 2;
12 the adjusting nuts upon the screws 11;
13 the adjustable compression springs;
14 the shanks of the adjusting screws 11, guided in the chuck 4;
15 a bevel wheel for driving the chuck 4;
16 a bevel wheel for driving the chuck 9; and
17 shanks of screws 20, fitted with adjusting nuts 19 for the compression springs 18 pressing together the parts of the counter-tool 10 in engagement with the smooth sheath or tube to be corrugated.

The counter-tool 10 shown on an enlarged scale in Fig. 6, consists conveniently of two or more jaws 21, which may have a helical form opposite in direction to the screw-thread of the forming-tool 2 since the two tools rotate in opposite directions. The diameter of the counter-tool is made such that it does not deform the sheath. The counter-tool is internally lined with a frictional material 22 which rubs upon the sheath as the tube is drawn forward into the tool 2, and at the same time neutralizes the torque produced by the forming tool.

As will be understood, it is possible instead to provide a counter-tool which only removes the torque, without drawing the tube into the forming tool. The counter-tool 10 can be constructed substantially in the same manner as the forming-tool 2, with the difference that in its operation it does not form corrugations but merely reduces the diameter of the tube. The two tools, corrugation former and counter-tool, are adapted to one another in such manner that the profile height δ according to the invention is obtained. In general it is expedient to produce the corrugations only by means of the forming tool 2, since they then retain the soft state of the original tube.

If the metal sheath is produced from a metal strip which is rounded to form a tube with the abutting or overlapping edges welded together, the smooth tube is preferably corrugated only after its completion for the whole cable length, without joint or interruption.

Figure 7:
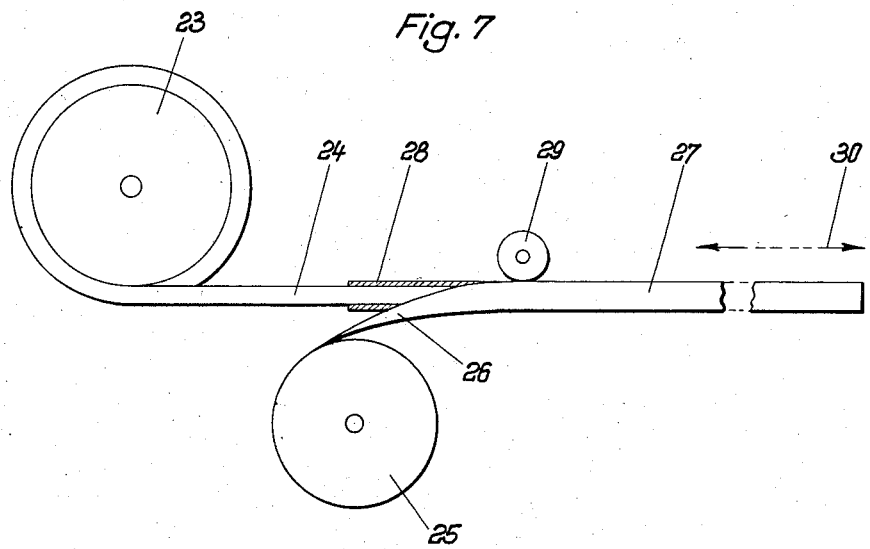
Fig. 7 represents diagrammatically the production of a tubular sheath from a metal strip.

Fig. 7 shows diagrammatically, by way of example, an arrangement for carrying out this production of the sheath; in this figure:

23 is a cable drum carrying the unsheathed cable-core 24;
25 the supply drum for the smooth metal strip 26;
27 the tube wound from the flat strip and provided with a welded, soldered or cemented seam;
28 a stationary hollow mandrel, which may be provided with cooling means, about which mandrel the metal strip 26 is wound to form the tube 27 and upon which the abutting or overlapping strip edges are welded in the cold or hot state, soldered or cemented, to form the seam;
29 a pressure roller whereby the strip edges are pressed against or over one another and are if necessary welded, in the cold or hot state, soldered, or cemented;

30 is the laying out base for a manufacturer's length of cable.

Figure 8:
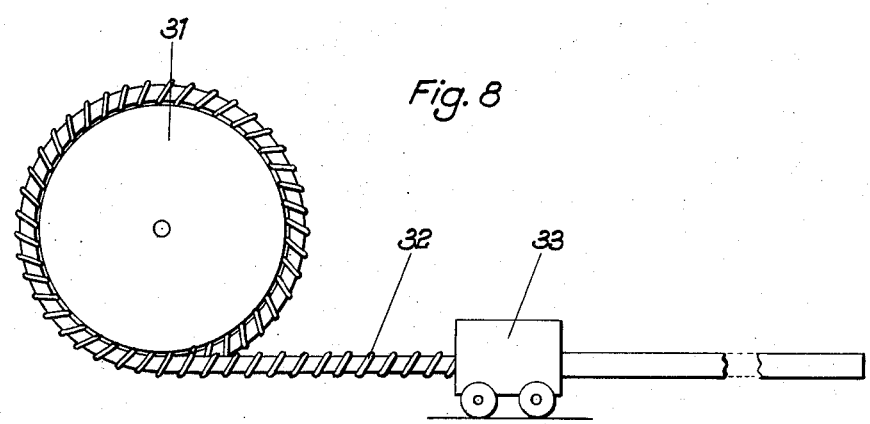
Fig. 8 is a diagram showing an installation for the corrugation of the tubular sheath, the finished cable being wound upon a drum.

Fig. 8 shows diagrammatically and by way of example an installation for the production of the corrugated cable-sheath, wherein:

31 is a drum for winding on the finished cable 32 with the corrugated cable-sheath;

32 the completed cable-length with the corrugated sheath;

33 the corrugating device, which preferably runs on wheels.

As shown in Fig. 7, the cable-core is drawn out to its full length on the laying out base 30 simultaneously with the sheath manufactured from the strip, which sheath has an internal diameter greater than the external diameter of the cable-core. The speed for the drawing out of the tube with the core situated therein need only be adapted to the most expedient speed for the formation of the seam. The tube manufactured in this manner is closed around the core by means of the corrugating device 33, as shown in Fig. 8, for which purpose the corrugating device can be moved along the entire cable-length. More expediently, however, the cable is wound on to the drum 31 during the corrugation. As will be understood the torsional moment or torque exerted by the corrugating tool is taken up on the one hand by the cable end fixed to the drum, and on the other hand by a movable device in which the other end of the cable is clamped or by means of the counter-tool 10 already described. The corrugating device is preferably arranged on wheels, as the speed of winding up the cable does not then need to conform absolutely to the speed of the corrugating device. Thus if the drum 31 runs too quickly, or too slowly, the corrugating device 33 will run towards or away from the drum; the speed of the latter thus only needs to be regulated so that the corrugating device 33 remains stationary as far as possible.

In another embodiment of the invention, the sheath-tube can be manufactured without the cable-core, laid out on the base 30, and the core only then introduced into the tube. This provides the advantage that the soldering, cementing, hot-welding or cold-welding can be carried out without consideration of the delicate cable-core, which is then drawn into the completed tube subsequently.

As may be understood, it would also be possible for the tube to be wound upon a drum without the core, after the seam has been formed, and for the core to be drawn into the tube after it has been reeled off the drum and paid out on the laying out base. In this case the tube can be manufactured in a locality remote from the laying out base.

Such corrugated sheaths are advantageously used with all types of cable-cores. The corrugations being shallower than the deeply corrugated profiles of the known sinusoidally-profiled sheaths, a heavy-current or high-tension cable sheathed according to the present invention will have only relatively small hollow spaces between the core and the sheath; these cavities can easily be filled with impregnating compounds.

With high-tension cables, the invention offers also the further advantage, in the case of expansion, that the impregnating compound is pressed out of the expansion elements into the hollow spaces which occur within the insulation, when the core is stretched. Thus it is no longer possible for objectionable hollow spaces to occur, as are otherwise unavoidable in the case of expansion. The expansion elements of the cable are formed in such a way that the angle $\alpha$ at the crown of the arch (Fig. 2) is at least 90°. The corrugation profile, in the simplified form shown in Fig. 2, forms a triangle having the base $b$ and the height $\delta$. The area of this triangle is $$F = \frac{b \cdot \delta}{2}$$

If the length of each of the other sides of the triangle is S, $$\frac{b}{2} = S \sin \frac{\alpha}{2} \text{ and } \delta = S \cos \frac{\alpha}{2}, \therefore F = \frac{S^2}{2} \sin \alpha$$

Accordingly, when the expansion element is stretched and thus the angle $\alpha$ is altered, the surface area below the arch of the expansion element passes first from 0 to the maximum value $$\frac{S^2}{2}$$

and on further stretching it tends to return to 0. The maximum value is reached when $\alpha = 90°$.

The corrugated sheaths according to the invention are suitable especially for high-tension cables operated with internal pressure. On the one hand, the cylindrical parts of the cable-sheath, which rest upon the cable-core, are work-hardened by their deformation, while on the other hand the undeformed and therefore unhardened expansion elements have increased static stiffness, due to their curvature.

The helically arranged corrugations are suitable for transmission of internal pressure, so that the so-called gas-cushion cables can be produced very simply by use of these corrugated sheaths. For this purpose, it is only necessary for the counter-tool 10 to be replaced by a forming tool with helices running in the opposite direction to those of the tool 2. Thus two opposite helices will be formed on the sheath. These helices intersect, and thus provide the bag-like hollow spaces characteristic of gas-cushion cables. When gas-cushion cables are being produced, it is expedient for the tube to be filled with the gas, which may if desired be under increased pressure, before the cable-core is drawn in, or directly after the cable-core is drawn in, before the formation of the corrugations is commenced.

Cables with these improved sheaths can be dried and impregnated without difficulty, since their sheaths have, in the corrugations or bellows which are provided in order to give sufficient flexibility, longitudinal channels of sufficiently large cross-section, through which the core can be dried and impregnated satisfactorily from the cable ends. The diameter of the core and of the cable with a corrugated or bellows-like sheath need thus no longer be additionally enlarged, as in the case of cables with smooth sheaths, in order to provide a hollow space in which the pressure can be transmitted to the cable-impregnating compound.

Figure 9:
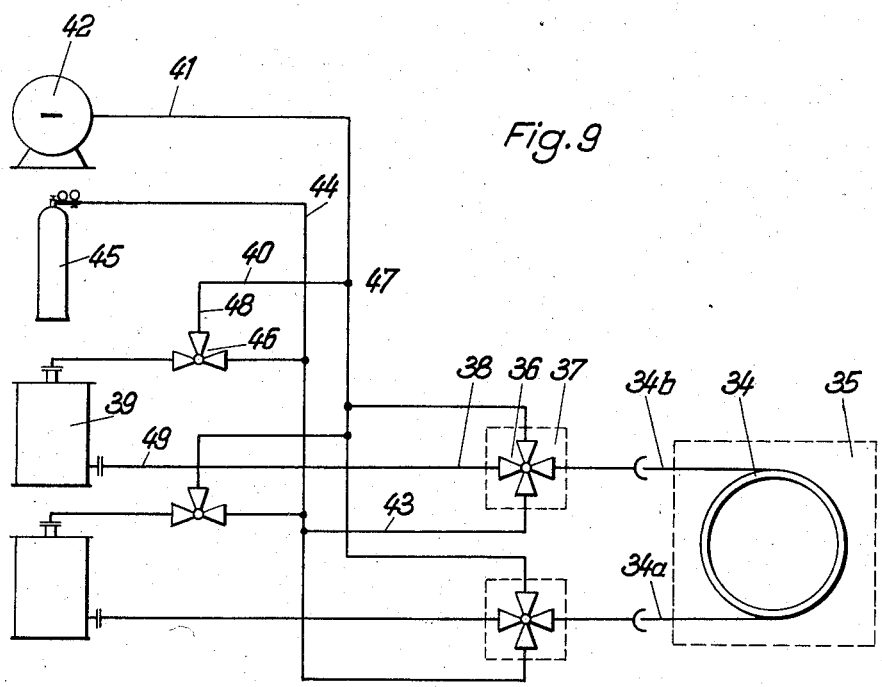
Fig. 9 is a diagram showing apparatus employed for the evacuation, drying and impregnation of the sheathed cable.

Cables with such sheaths, according to the invention, can be evacuated, dried and impregnated from the cable ends. The most diverse types of high-tension cables, for example dry, gas-pressure, or gas-cushion cables, are obtained in the following manner with the arrangement illustrated diagrammatically in Fig. 9, wherein:

34 is the cable completely wound upon its drum, 34a, 34b being the two ends of the cable;

35 is a drying chamber;

36 vacuum-tight multi-way valves, which may, if desired, be heatable, enclosed in one or more vacuum containers 37;

38 connecting ducts between the valves 36 and heatable impregnating compound containers 39;

40 connecting ducts between the valves 36 and a vacuum duct 41 leading to a vacuum pump 42, a condenser being interposed if necessary;

43 connecting ducts between the valves 36 and a pressure gas duct 44;

45 a pressure pump or pressure gas cylinder, attached to the pressure duct 44, a drying condenser being interposed if necessary;

46 vacuum-tight multi-way valves, which may if desired be enclosed in one or more vacuum containers, which can be heated if necessary;

47 connecting ducts leading from the valves 46 to the vacuum duct 41;

48 connecting ducts between the pressure gas duct 44 and the valves 46; and 49 connecting ducts between the impregnating compound containers 39 and the valves 46.

It is convenient to operate in the following manner with this arrangement:

The cable heated in the drying chamber 35 is first evacuated from both ends by appropriate setting of the valves by means of the vacuum pump 42, then if desired dry pressure gas is blown through or into the cable from one or both ends. It is preferable for evacuation to be effected from one end, and the dry compressed air or the inert pressure gas to be forced in from the other end.

As soon as the cable has been sufficiently dried and evacuated, the valves 46 are switched over to the vessels 39, one of which is under vacuum and the other under pressure. Thus the channels between the metal sheathing and the cable-core are filled with impregnating compound from the vessel 39 which is under pressure. The impregnating compound flows in the channels throughout the cable, into the other vessel 39 which is under vacuum. As soon as the impregnating compound reaches this point, which is indicated by the rising of the impregnating compound in the container, it is apparent that the channels between the metal sheath and the core are filled with the impregnating compound; both vessels 39 are then changed over to atmospheric or higher pressure. The impregnating compound is now forced into the channels from both ends of the cable and also sucked up by the vacuum present in the cable, and at the same time driven radially into the dielectric of the cable core. It is also possible, if desired, to place one container 39 under vacuum and the other under pressure, and to alternate these connections during the impregnating process.

The cable-cores dried and impregnated in this manner are superior to those cable-cores which have been dried and impregnated in the usual manner in an impregnating boiler due to their substantially improved dielectric properties; the vacuum to be obtained within the cable sheath with the latter arrangement is substantially higher than the vacuum which can be obtained in an impregnating vessel, since the sealing surfaces and the volume are substantially less in this case. Accordingly pumps with a substantially smaller output are sufficient, these producing better vacuum. Only a small quantity of impregnating compound is necessary here for the impregnation, since only exactly as much impregnating compound is used as the metal sheath retains.

As a further advantage of the invention, it is also possible to produce other types of high-tension cables, for example dry, gas pressure and gas-cushion cables, and cables with gas-charged impregnating compound and/or gas-charged dielectrics.

In order to produce a dry cable, the cable-core enclosed in the sheath tube is dried and impregnated in the manner described above. Superfluous impregnating compound, which is undesirable in the dry cable, is removed after impregnation, by evacuation of the cable while the cable ends are no longer immersed in the impregnating compound; superfluous compound is thus drawn out of the dielectric, and can now no longer penetrate into the dielectric with the impregnated paper, or like insulation, if the vacuum is removed and the normal pressure of air or of inert gas is admitted to the impregnating compound container. Superfluous impregnating compound is thus completely removed from the dielectric. If desired, air or gas can be blown through the cable from one end to the other, in order to force the impregnating compound out of the longitudinal channels. After laying of the cable manufactured in this manner, it can be placed under gas pressure, or even under pressure of impregnated compound, from the end seals.

If desired, a cable with such dry cable-core, from which the impregnating compound has been more or less completely removed by blowing and/or evacuation, and which is now filled with air or gas, can be filled with air, gas or impregnating compound through the channels of the core or corrugations; thus a gas-cushion cable or a pressure-gas cable can be produced which is operated, after laying, under increased pressure. Its gas-content, as may be understood, is greater than in the case of a cable of which the impregnating compound has not been forced out of the dielectric by evacuation after the impregnation of the cable-core.

Cables with gas-charged impregnating compound can be obtained also, in accordance with the invention, by forcing gas-saturated impregnating compound under pressure through the longitudinal channels from one end of the cable, which may have a partly dried core, an impregnated core, or a dry-cable core, and then keeping the cable under compound or gas pressure, after filling it with the impregnating compound from one or both ends.

On the other hand, a high-grade dielectric with an impregnating oil or liquid compound, degasified as far as possible, can be produced by forcing the impregnating liquid, which has preferably been degasified under vacuum, especially under high vacuum, into the metal cable-sheath by means of a pressure pump.

Figure 10:
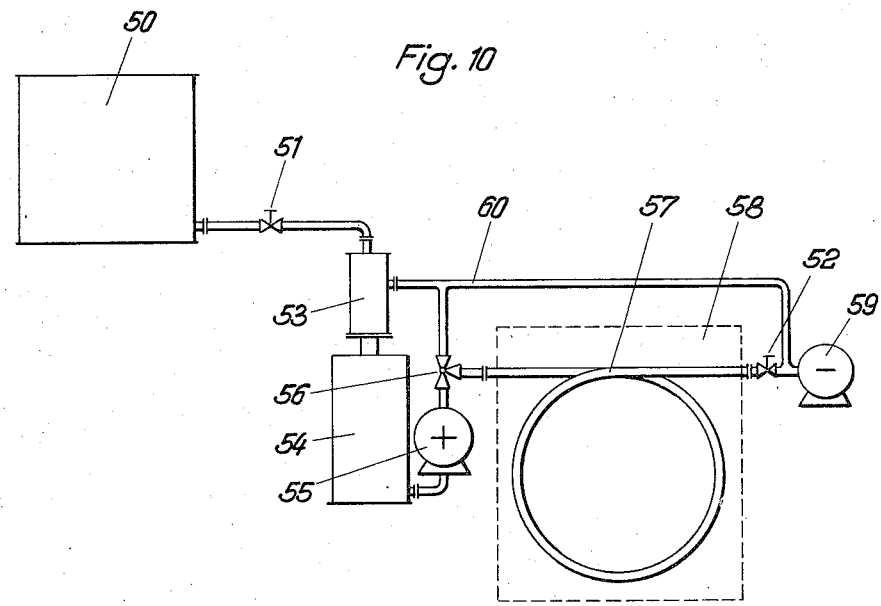
Fig. 10 represents an arrangement for the impregnation of the evacuated cable.

Fig. 10 serves to illustrate the idea, and represents by way of example an arrangement with which the degasified impregnating liquid is forced into the evacuated cable. In this figure, 50 represents a container for the liquid not yet degasified, 51 being a shut-off valve in the duct leading from the container 50 to the degasifying device 53;

52 a throttle valve between a vacuum pump 59 and the end of the cable 57 installed in a heating oven 58;

54 a collecting vessel for the degasified impregnating liquid;

55 a pressure pump arranged between the collecting vessel 54 and the cable sheath;

56 a three-way cock, and 60 a vacuum duct connecting the vacuum pump 59 and the degasifying device 53, with a branch to the three-way cock 56.

The impregnating liquid in the container 50 is fed to the degasifying device 53 through the valve 51, under vacuum. This degasifying device is arranged in such a manner that the impregnating liquid presents a large surface area therein, being led, for example, over filling materials or baffles. The impregnating liquid degasified therein is collected in the container 54 from which it is forced by means of the pressure pump 55 through the three-way cock 56 into the cable 57, which is heated in the oven 58 and evacuated by means of the vacuum pump 59. The two ends of the cable can be connected selectively to the pump 59 by means of the three-way cock 56, and thus dried and evacuated from both ends before the impregnating liquid is introduced. The degasifying arrangement 53 is also connected to the same duct 60. By means of the arrangement and operation described, as will be readily understood, a gas-free impregnating liquid is supplied to the cable-core and a very thoroughly degasified dielectric is obtained, such as could not be achieved with the processes hitherto in use.

The throttle valve 52 serves for the regulation of the vacuum at the end of the cable, whereby a less intense vacuum can be set at the end of the cable than over the liquid contained in the vessel 54. Accordingly the impregnating liquid forced into the cable 57 by means of the pump 55 will be completely free of froth and foam. As will be understood, it is also possible to connect the cable end and the degasifying arrangement 53 to two separate vacuum pumps, producing different intensities of vacum.

A cable-sheath made of iron or aluminium is, as is known, very liable to corrosion, if without effective protection. It should therefore be covered with an anticorrosion protective skin of thermoplastic and/or vulcanized substances. Such a skin is usually produced with a screwpress, through the mouthpiece of which the cable is passed, the protective substance being thus extruded around the cable in a seamless form. If a corrugated sheath is covered in this manner with the protective substance, the skin obtained will have its maximum wall thickness in the depressed parts of the corrugations, and its minimum wall thickness over the raised parts of the corrugations, which is very undesirable, since the wall thickness of the skin should be least in the depressed portions of the corrugations, and the greatest over the raised portions. The invention provides for such desirable protective skin with nonuniform wall thickness, adapted to the corrugated sheath, and produced by means of a screw-press such as already known; the extrusion head has a hollow mandrel inserted for the production of the skin, upon which mandrel the plastic skin is produced in tubular form, and through which the metal sheath is led.

Figure 11:
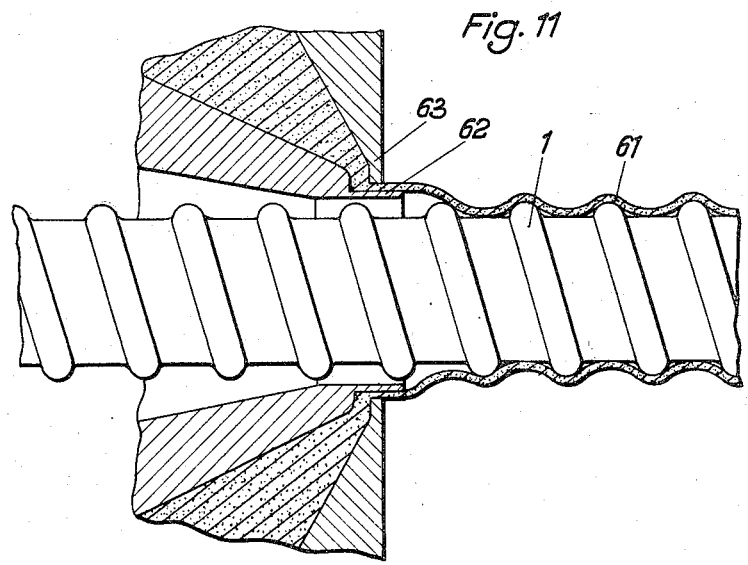
Fig. 11 is a section of an extrusion press with hollow mandrel whereby the corrugated cable-sheath is covered with an outer protective skin.

Fig. 11 illustrates the operation whereby the skin is produced on the corrugated metal sheath; in this figure, 1 represents the corrugated metal cable sheath, and 61 its protective skin; 62 the hollow mandrel arranged in the extrusion head of the press; and 63 the mouthpiece of the extrusion head.

This device produces a tube of protective material having a greater diameter than the maximum diameter of the metal sheath. The cable is drawn through the mandrel at a greater speed than corresponds to the speed of emergence of the tube of plastic material so that the tube shrinks or shrivels and its wall thickness is proportionately reduced. Accordingly it will have a greater wall thickness over the raised portions of the corrugated sheath than over the depressed portions, since over the latter it shrivels to a smaller diameter.

For the production of the protective skin or cover, it is desirable to use a screw-press device, the hollow mandrel 62 of which has such a wall thickness, and such properties of heat conductivity and heat capacity, that it supplies the plastic material emerging from the press with the heat necessary for deformation.

What we claim is:

1. A protective sheathing for cables and the like, comprising a unitary circumferentially continuous metallic tubing of substantially uniform wall thickness having a helical corrugation therein forming spaced expansible portions of outwardly arched cross section separated by non-expansible portions adapted to rest flat on the cable surface, said non-expansible portions being wider than said expansible portions, as measured along the length of said sheathing, and said expansible sheathing portions extending entirely around the sheathing and being of outwardly arched cross-section to extend radially outwardly from the core and having a radial dimension defining the height of the arch such that the expansible elements will flatten out to substantially straight cross-section on the outside of the curve when the cable is bent to its minimum bending radius.

2. A sheathing according to claim 1, wherein the width of said non-expansible portions is 1.6 times the width of said expansible portions.

3. An electric cable having an insulated core surrounded entirely and completely enveloped by a unitary circumferentially continuous corrugated metallic sheathing, said sheathing comprising alternate outwardly-arched and flat portions, the outwardly-arched portions being softer than the flat portions and being expansible in the direction of the cable axis, the flat portions resting upon the cable core and being non-expansible, and the outwardly-arched expansible portions having a breadth about $$\frac{3-\sqrt{5}}{2}$$

times the aggregate breadth of one expansible portion and one flat portion measured in the longitudinal direction of the cable.

4. An electric cable having a cable-sheath as defined in claim 3, wherein the height of the arch of every expansible portion is about $$\sqrt{\frac{1}{4(k+1)^2}+\frac{v}{2(k+1)}}$$

times the aggregate breadth of one outwardly-arched portion and one flat portion, measured in the direction of the cable axis, wherein $k$ is the ratio of the minimum bending diameter of the cable to the outside diameter of the cable and $v$ is equal to about $$\frac{3-\sqrt{5}}{2}$$

5. A sheathing as defined in claim 3, wherein the width of said expansible portions is about $$\frac{\sqrt{5}-1}{2}$$

times the width of said non-expansible portions.

6. An electric cable having an insulated core surrounded entirely and completely enveloped by a unitary circumferentially continuous corrugated metallic sheathing, said sheathing comprising alternate outwardly-arched and flat portions, the outwardly-arched portions being softer than the flat portions and being expansible in the direction of the cable axis, the flat portions resting upon the cable core and being non-expansible, and the outwardly-arched expansible portions having a breadth about $$\frac{3-\sqrt{5}}{2}$$

times the aggregate breadth of one expansible portion and one flat portion measured in the longitudinal direction of the cable, the height of the arch of every expansible portion is about $$\sqrt{\frac{1}{4(k+1)^2}+\frac{v}{2(k+1)}}$$

time the aggregate breadth of one outwardly-arched portion and one flat portion, measured in the direction of the cable axis, wherein $k$ is the ratio of the minimum bending diameter of the cable to the outside diameter of the cable and $v$ is equal to about $$\frac{3-\sqrt{5}}{2}$$

said sheathing being helically corrugated with the pitch of the helix being equal to the aggregate breadth of one expansible portion and one flat portion measured in the longitudinal direction of the cable, said cable further comprising a protective covering made of thermoplastic material, said covering having a greater wall thickness over the crests of the outwardly-arched portions than between two adjacent crests.

7. An electric cable having an insulated core surrounded entirely and completely enveloped by a unitary circumferentially continuous corrugated metallic sheathing, said sheathing comprising alternate outwardly-arched and flat portions, the outwardly-arched portions being softer than the flat portions and being expansible in the direction of the cable axis, the flat portions resting upon the cable core and being non-expansible, and the outwardly-arched expansible portions having a breadth about $$\frac{3-\sqrt{5}}{2}$$

times the aggregate breadth of one expansible portion and one flat portion measured in the longitudinal direction of the cable, said sheathing being helically corrugated and the pitch of the helix being equal to said aggregate breadth of one expansible portion and one flat portion.

References Cited in the file of this patent

UNITED STATES PATENTS

| | | | |
|---|---|---|---|
| 1,514,292 | Knoderer | Nov. 4, | 1924 |
| 1,812,686 | Crowdes | June 30, | 1931 |
| 2,000,680 | Weatherhead | May 7, | 1935 |
| 2,009,820 | Shanklin | July 30, | 1935 |
| 2,025,427 | Weatherhead | Dec. 24, | 1935 |
| 2,043,044 | Knoderer | June 2, | 1936 |
| 2,052,938 | Neuhold | Sept. 1, | 1936 |
| 2,348,641 | Parker | May 9, | 1944 |
| 2,357,686 | Peel | Sept. 5, | 1944 |
| 2,374,498 | Quayle | Apr. 24, | 1945 |
| 2,427,930 | Gittner | Sept. 23, | 1947 |
| 2,464,598 | Meier et al. | Mar. 15, | 1949 |
| 2,496,790 | Guarnaschelli | Feb. 7, | 1950 |
| 2,531,156 | Piercy | Nov. 21, | 1950 |
| 2,611,413 | Molinare | Sept. 23, | 1952 |

FOREIGN PATENTS

| | | | |
|---|---|---|---|
| 846,632 | France | June 12, | 1939 |